(12) United States Patent
Kerr

(10) Patent No.: US 6,766,891 B2
(45) Date of Patent: Jul. 27, 2004

(54) POWER TRANSFER DEVICE

(75) Inventor: John Hugh Kerr, Kingston (CA)

(73) Assignee: Ker-Train Holdings Ltd, Kingston (CA)

(*) Notice: Subject to any disclaimer, the term of this patent is extended or adjusted under 35 U.S.C. 154(b) by 0 days.

(21) Appl. No.: 10/454,857

(22) Filed: Jun. 5, 2003

(65) Prior Publication Data

US 2003/0196862 A1 Oct. 23, 2003

Related U.S. Application Data

(62) Division of application No. 10/068,028, filed on Feb. 5, 2002, which is a division of application No. 09/554,328, filed as application No. PCT/CA98/01073 on Nov. 26, 1998, now Pat. No. 6,367,604.

(51) Int. Cl.[7] .......................... F16H 61/60; F16D 43/00
(52) U.S. Cl. ...................................... 192/45; 192/48.92
(58) Field of Search ........................... 192/103 R, 41 R, 192/43, 44, 45, 43.1, 43.2, 48.92, 70.2, 47; 475/318, 57, 61, 320, 321, 322

(56) References Cited

U.S. PATENT DOCUMENTS

| | | | | | |
|---|---|---|---|---|---|
| 2,747,433 | A | * | 5/1956 | Forster | 475/144 |
| 3,741,037 | A | * | 6/1973 | Piret | 475/148 |
| 4,114,478 | A | * | 9/1978 | Clauss | 475/144 |
| 4,123,952 | A | * | 11/1978 | Wayman | 475/59 |
| 5,234,389 | A | * | 8/1993 | Goates | 475/297 |

* cited by examiner

Primary Examiner—Saul Rodriguez
(74) Attorney, Agent, or Firm—Clark Hill PLC

(57) ABSTRACT

A power transfer device for amplifying and transmitting torque consists of an impeller (14), a turbine (16), a stator (18). A one-way clutch (32) responsive to impeller (14) rotational speed allows the stator (18) to rotate when the turbine is stationary or during high speed operation.

3 Claims, 7 Drawing Sheets

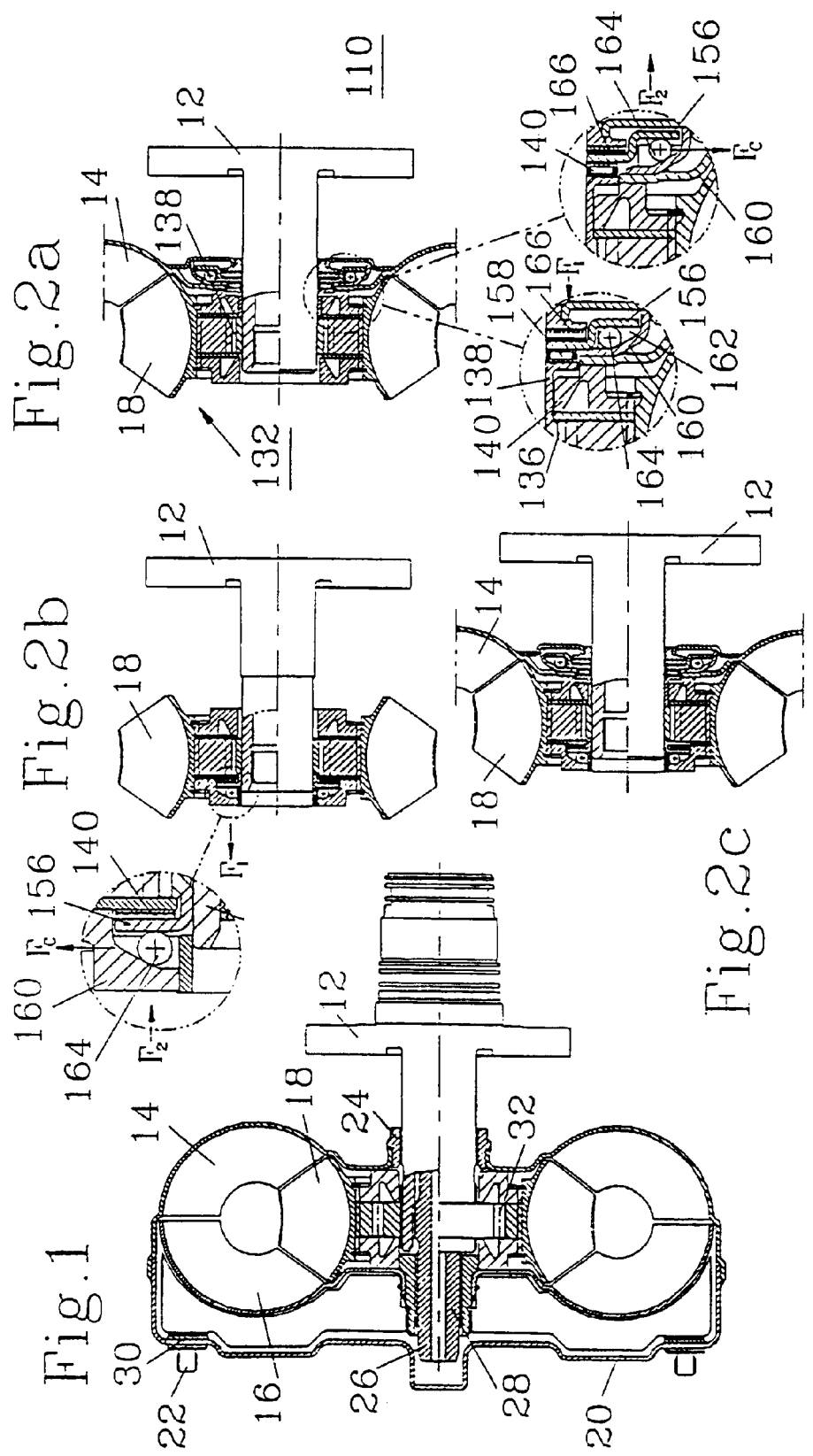

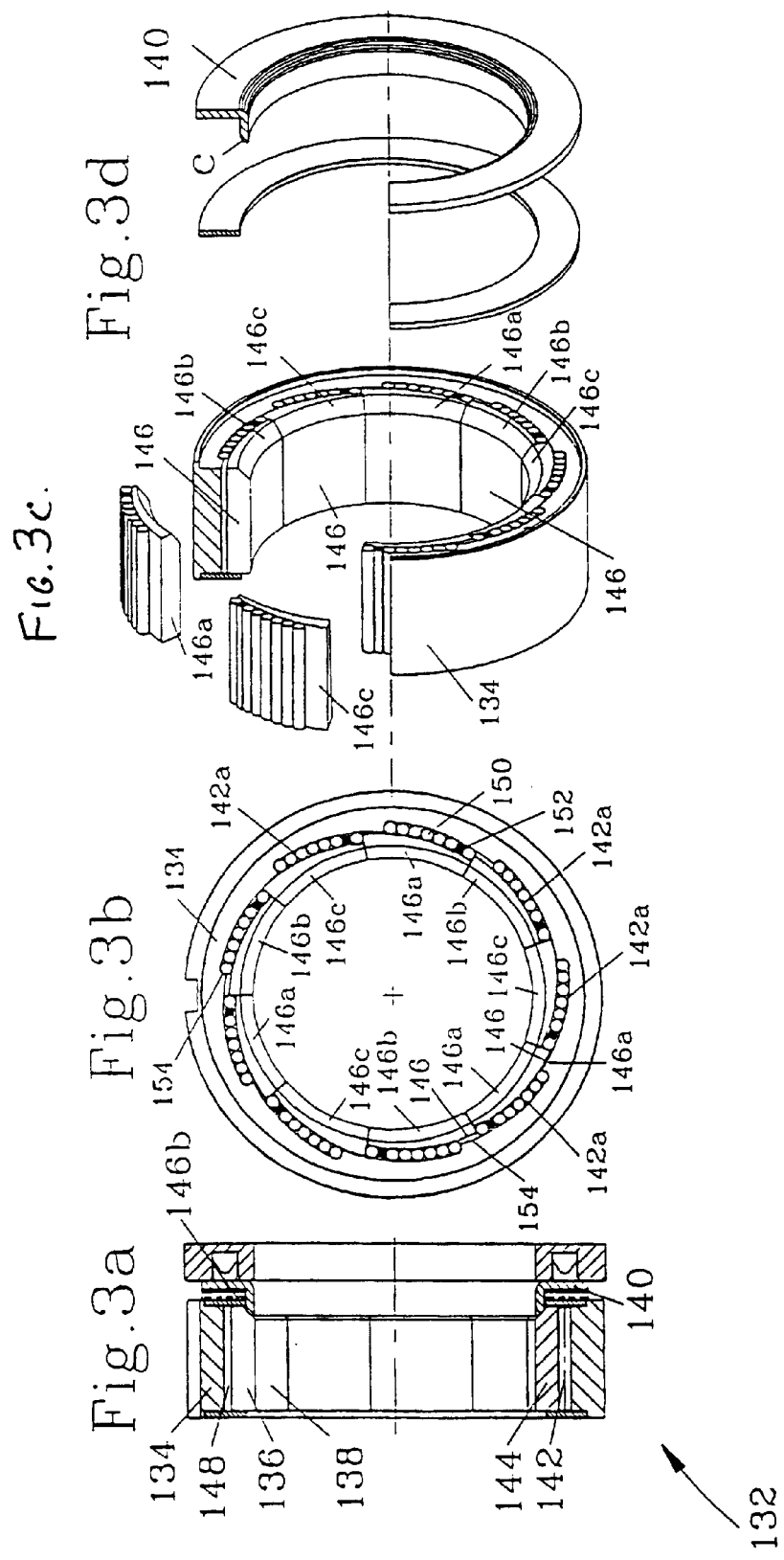

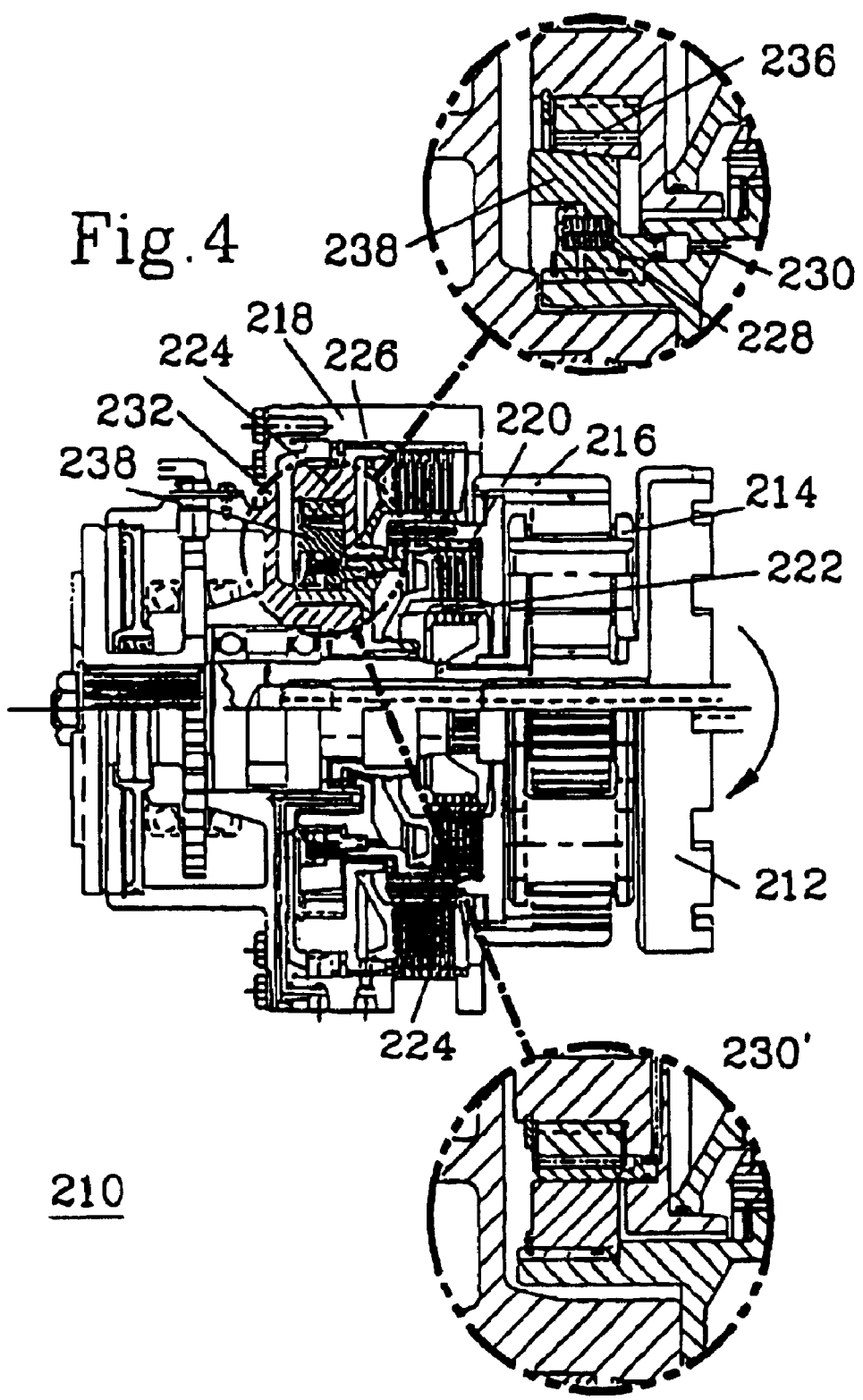

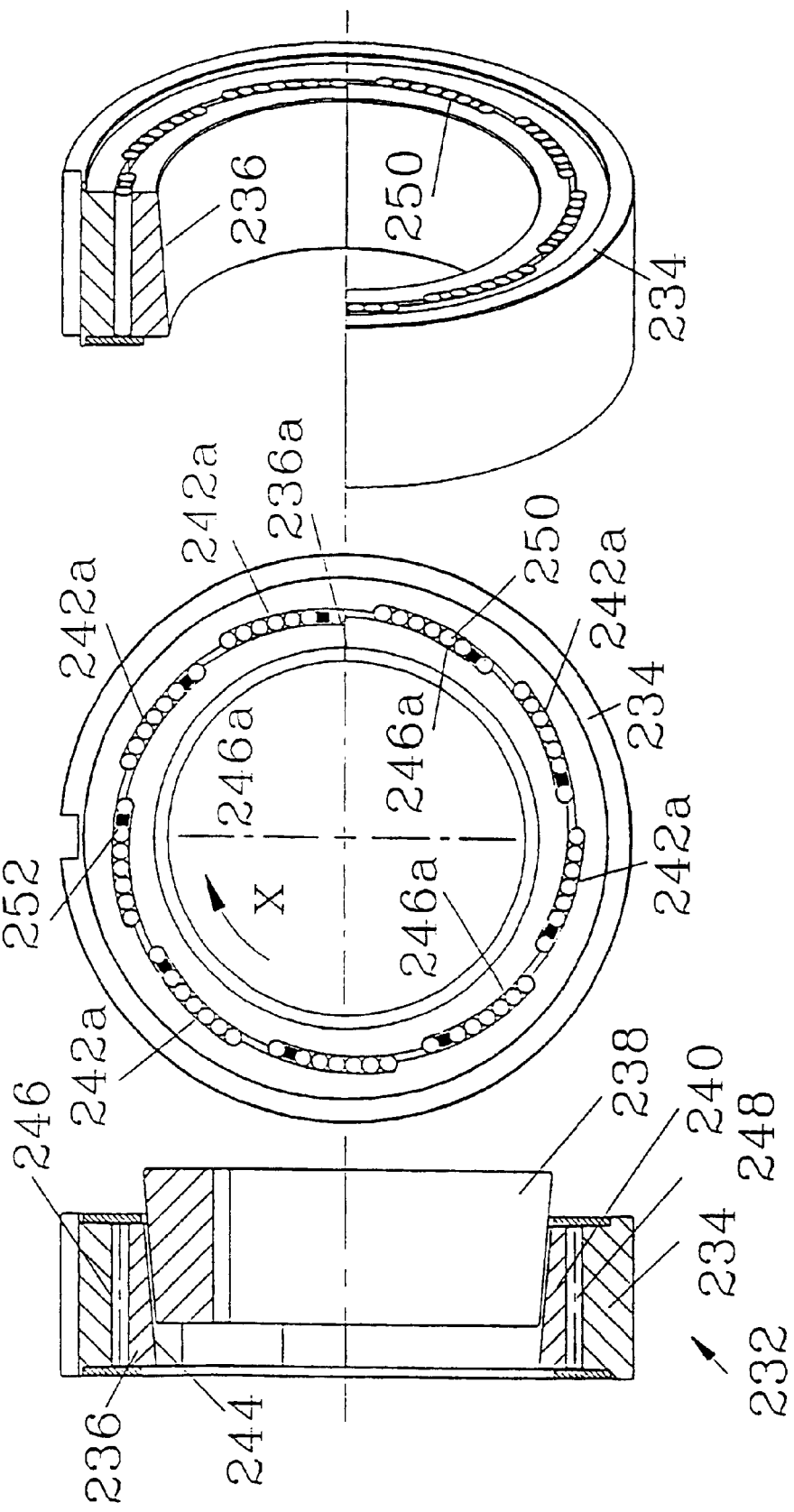

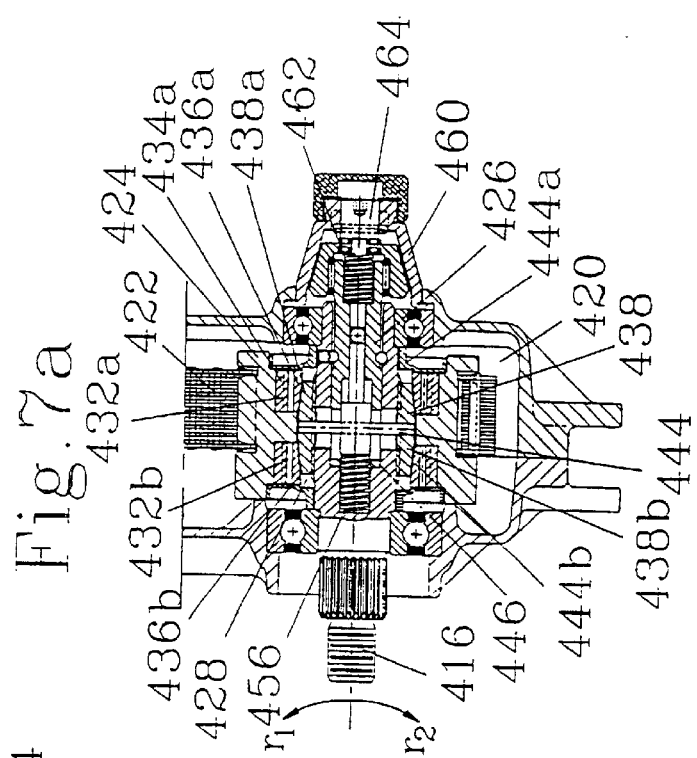
Fig. 6 - PRIOR ART
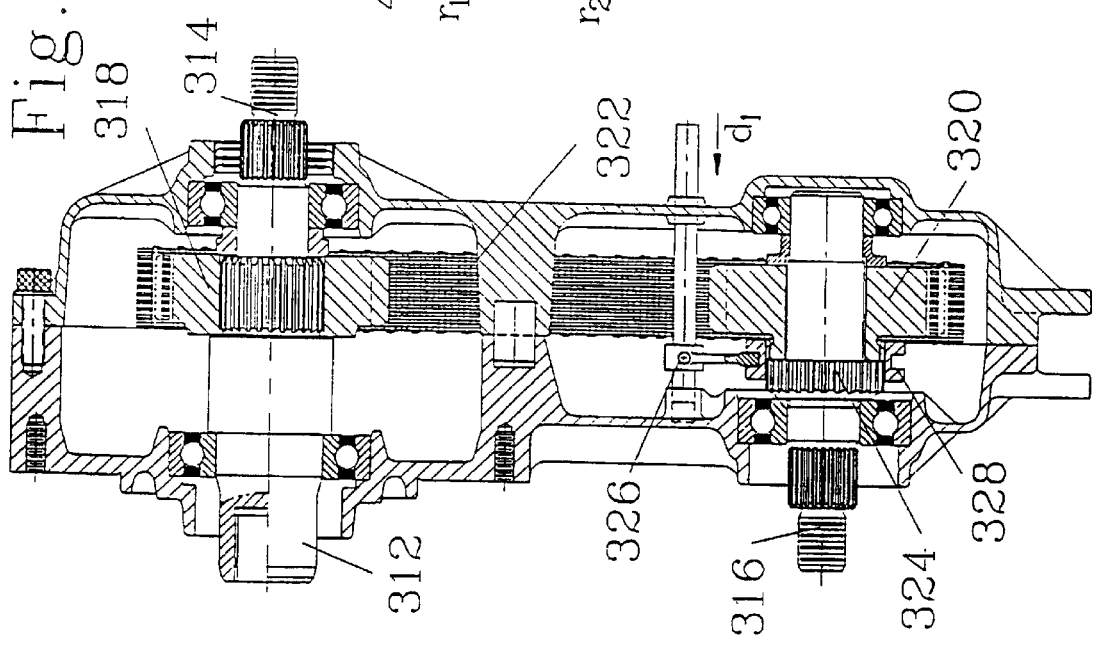
Fig. 7a

POWER TRANSFER DEVICE

RELATED APPLICATIONS

This application is a divisional of co-pending application Ser. No. 10/068,028 filed on Feb. 5, 2002, which is a divisional application 09/554,328 filed on Jul. 17, 2000 now U.S. Pat. No. 6,367,604, issued on Apr. 9, 2002, which is the U.S. national stage of PCT application no. CA/98/01073 filed on Nov. 26, 1998.

FIELD OF THE INVENTION

The present invention relates to devices for transferring power from a rotating input shaft to an output shaft. In particular, the present invention relates to torque converters, automatic gearboxes, and power transfer cases which employ clutches for effecting the transfer of power.

BACKGROUND OF THE INVENTION

Over the past several years, automotive manufacturers have been forced to produce automobiles which are more fuel efficient and produce less harmful emissions. The vast majority of improvements in the areas have been with fuel delivery systems, emission control systems and vehicle aerodynamics. However, torque converters, automatic gearboxes and power transfer cases are other, often overlooked, sources of inefficiency and harmful emissions.

Conventional torque converters consist of an impeller coupled to a rotating input shaft, a turbine coupled to an output shaft, and a stator in communication with the impeller and the turbine. As the impeller blades rotate, the impeller directs hydraulic fluid between the stator and the turbine, urging the stator to rotate in the direction opposite to that of the impeller and the turbine. However, in order that the input torque from the impeller is amplified, the stator must be prevented from reverse rotation. On the other hand, during high speed operation, it is desirable to couple the impeller directly to the turbine through a lock-up disc clutch. In this mode, commonly referred to as converter lock-up, it is necessary for the stator to rotate with the impeller and the turbine and in the same direction as the impeller and the turbine. Accordingly, it has been common practice to couple the stator to the converter housing through a roller ramp one-way clutch which prevents the stator from rotating backwards, but allows the stator to rotate with the impeller and the turbine during converter lock-up.

However, when an automobile fitted with a conventional torque converter is stopped, with the brakes engaged and the engine still running, the torque converter subjects the engine to drag since the turbine is no longer free to move. As a consequence, it is necessary to idle the engine at increased speed to overcome the drag placed on the engine. The increased idle speed requires more fuel to be consumed and produces environmentally harmful emissions. Furthermore, the roller ramp one-way clutch does not rotate freely even when freewheeling. As a result, when the torque converter is in lock-up mode and the stator rotates with the impeller and turbine, the one-way clutch again produces a small drag on the engine thereby increasing fuel consumption.

Conventional automatic gearboxes consist of a planetary gear set comprising a torque input member coupled to an input shaft, a torque output member coupled to an output shaft, and a reaction member in communication with the torque input member and the torque output member. To effect gear changes, the automatic gearbox includes a first clutch pack for grounding the reaction member to the gearbox casing, and a second clutch pack for coupling the reaction member either to the torque input member or the torque output member. However, the magnitude of the torque required to be transmitted by the clutch packs has led to the use of expensive disc clutches having a large number of plates, thereby increasing the weight of the gearbox. Further, since each clutch pack has only two states, namely engaged or disengaged, shifting between gear is often abrupt. These abrupt changes detrimentally affect fuel flow, thereby reducing fuel efficiency and increasing fuel consumption.

Conventional four-wheel drive power transfer cases consist of an input shaft, a rear wheel torque output shaft coupled to the input shaft, a front wheel torque output shaft; and a torque transfer gear assembly for transferring torque from the input shaft to the front wheel torque output shaft. The torque transfer assembly generally consists of a first sprocket splined to the input shaft, a second sprocket rotatably disposed around the front wheel torque output shaft, a chain trained around the first and second sprockets, a series of splines provided on the front wheel torque output shaft, and a splined ring for coupling the second sprocket to the front wheel torque output shaft. To reconcile the differential rotation between the front and rear torque output shaft during vehicle manouevres, manufacturers generally include a friction clutch disposed between the second sprocket and a coaxially mounted shaft which allows clutch slippage to occur. However, clutch slippage interrupts smooth power transfer during cornering, thereby reducing fuel efficiency and fuel consumption.

Accordingly, it would be environmentally beneficial to provide torque converter designs, automatic gearbox designs and power transfer case designs which reduced the inefficiencies associated with the use of the clutches employed therein.

SUMMARY OF THE INVENTION

It is an object of the invention to provide a power transfer device which reduces the inefficiencies associated with the prior art power transfer devices.

According to a first embodiment of the invention, there is provided a power transfer comprising a torque input member; a torque output member; a torque reactive member coupled to a rotational reference and being in communication with the torque input member and the torque output member for amplifying and transmitting torque from the torque input member to the torque output member; and a clutch responsive to torque input member rotational speed for releasing the torque reactive member from the rotational reference when the rotational speed reaches a threshold value.

According to a second embodiment of the invention, there is provided a power transfer device comprising a torque input member; a torque output member; a reactive member in communication with the torque input member and the torque output member; and a binary clutch for automatically switching the reactive member between a first mode coupling to a rotational reference and a second mode coupling to one of the torque input member and the torque output member. The binary clutch comprises a first clutch for coupling the reactive member to the torque member, and a one-way clutch for progressively coupling and uncoupling the reactive member to and from the rotational reference when switching between the first and second mode.

According to a third embodiment of the invention, there is provided a power transfer device comprising a torque input member; a rear wheel torque output member coupled to the torque input member; a front wheel torque output member; and a torque transfer assembly for transferring torque from the torque input member to the front wheel torque output member. The torque transfer assembly comprises a pair of one-way clutches coupled between the torque input member and the front wheel torque output member and having opposite freewheeling directions of rotation for allowing overrunning of the front wheel torque output member independently of the direction of rotation of the torque input member.

BRIEF DESCRIPTION OF THE DRAWINGS

The invention will now be described, by way of example only, with reference to the drawings, in which:

FIG. 1 is an axial cross-sectional view of a prior art power transfer device for amplifying engine torque;

FIGS. 2a–2c are magnified axial cross-sectional views of a power transfer device according to a first embodiment of the invention;

FIG. 3a is an axial cross-sectional view of a spiral-type one way clutch used in the power transfer device shown in FIG. 2;

FIG. 3b is a transverse cross-sectional view of the spiral-type one way clutch shown in FIG. 3a;

FIG. 3c is an exploded view of the spiral-type one way clutch shown in FIG. 3a;

FIG. 3d is a perspective view of the actuator ring of FIG. 3a;

FIG. 4 is an axial cross-sectional view of a power transfer device according to a second embodiment of the invention;

FIG. 5a is an axial cross-sectional view of a spiral-type one way clutch used in the power transfer device shown in FIG. 4;

FIG. 5b is a transverse cross-sectional view of the spiral-type one way clutch shown in FIG. 5a;

FIG. 5c is an exploded view of the spiral-type one way clutch shown in FIG. 5a;

FIG. 6 is an axial cross-sectional view of a prior art power transfer device for transferring power between an input shaft and front and rear output shafts;

FIGS. 7a–7c are magnified axial cross-sectional views of a power transfer device according to a third embodiment of the invention;

DETAILED DESCRIPTION OF THE PREFERRED EMBODIMENTS

Figure 7B:
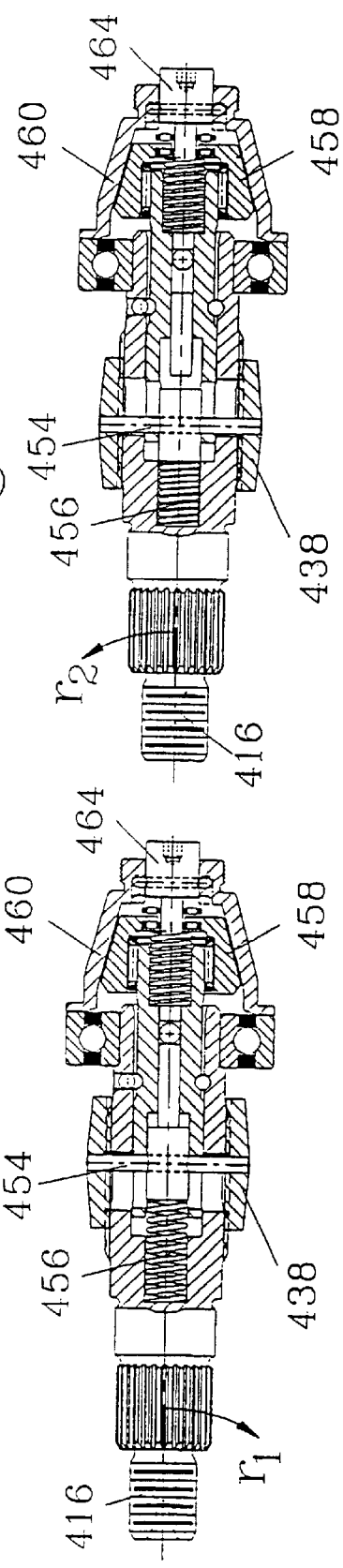

To assist in the understanding of a first embodiment of the invention, a prior art torque converter power transfer device will be described first, followed by a description of the first embodiment. Turning to FIG. 1, a prior art torque converter power transfer device, denoted generally as 10, is shown comprising a tubular stationary housing 12, an impeller 14 disposed around the housing 12, a turbine 16, and a stator 18 in fluid communication with the impeller 14 and the turbine 16. The impeller 14 includes an input flange 20 and lug nuts 22 for coupling the impeller 14 to torque input means, such as an engine bell housing (not shown), and is rotatably coupled to the housing 12 through a bearing 24 disposed around the housing 12.

The housing 12 also includes a coaxial rotating output shaft 26 extending through the housing 12. The turbine 16 is coupled to the output shaft 26 through splines 28 provided on the output shaft 26. A disc lock-up clutch 30 is provided between the impeller 14 and the turbine 16 for coupling the impeller 14 to the turbine 16 during converter lock-up.

The stator 18 is coupled to the housing 12 through a roller-ramp one-way clutch 32 which allows the stator 18 to rotate with the impeller 14 and the turbine 16 when lock-up clutch 30 is engaged. When lock-up clutch 30 is disengaged, the one-way clutch 32 prevents the stator 18 from rotating away from the impeller 16. As a consequence, when hydraulic fluid is impelled at the stator 18 from the impeller 14, the input torque applied to the impeller 14 is magnified and transmitted to the turbine 16 for delivery to the output shaft 26.

As discussed above, the conventional torque converter 10 increases engine drag while the vehicle is stationary since the turbine 16 is not free to rotate. As a consequence, it is necessary to idle the engine at increased speed to overcome the drag placed on the engine. The power transfer device 100, shown in FIG. 2a, ameliorates this deficiency.

Turning now to FIG. 2a, a power transfer device 110, according to a first embodiment of the invention, and in the form of a torque converter, is shown comprising the tubular stationary housing 12, the impeller 14 disposed around the housing 12, the turbine 16 (not shown), and the stator 18 in fluid communication with the impeller 14 and the turbine 16. The stator 18 is coupled to the tubular housing 12 through a spiral-type dual-mode one-way clutch 132. The structure and dynamics of the spiral-type one-way clutch 132 can be better understood by referring now to FIGS. 3a–3c.

The spiral-type one-way clutch 132, shown in FIGS. 3a–3c, comprises a tubular clutch housing 134 coupled to the stator 18, a tubular slipper 136 coaxial to and disposed within the clutch housing 138, a cylindrical race 138 coupled to the stationary housing 12 and being coaxial to and disposed with the slipper 134, and an actuator ring 140 coupled to the slipper 134. The clutch housing 134 has an inner tubular surface 142 which includes a plurality of counterclockwise outwardly spiraling surface portions 142a.

The slipper 136 includes an inner cylindrical friction surface 144, and comprises a plurality of slipper segments 146 disposed around the inner tubular surface 142. The slipper segments 146 include counterclockwise outwardly spiraling surface portions 146a, and chamfered edges 146b. The counterclockwise outwardly spiraling surface portions 146a are substantially congruent with the counterclockwise outwardly spiraling surface portions 142a. Preferably, the spiraling surface portions 142a, 146a are involute spirals so that as the clutch housing 134 rotates relative to the slipper 136, the spiraling surface portions 142a remain parallel to the spiraling surface portions 146a. However, other spiral shapes may be adopted as the application demands. The cylindrical race 138 includes an outer cylindrical friction surface congruent with the inner cylindrical friction surface 144.

The inner tubular surface 142 and the spiraling surface portions 146a together define a channel 148 disposed between the clutch housing 134 and the slipper 136 extending the length of the clutch housing 134 and the slipper 136. A plurality of roller bearings 150 and resilient elements 152 are disposed within the channel 148 to provide restricted rotational movement between the slipper 136 and the clutch housing 134 in a manner to be described below. As will be appreciated, the resilient elements 152 serve to soften the locking and unlocking of the clutch 132. The clutch housing 134 is provided with a plurality of flanges 154 extending radially inwards from the inner tubular surface 142 for restricting radial movement of the roller bearings ISO along the channel 148 and thereby reducing locking and unlocking time of the clutch 132.

The two modes of operation of the dual-mode spiral-type one-way clutch 132 will now be described. If the actuator ring 140 does not press against the chamfered edge 146b, the outer friction surface of the race 138 engages the inner frictional surface 144 of the slipper 136. As a result, if the clutch housing 134 is rotated counterclockwise, the counterclockwise outwardly spiraling surface portions 142a will rotate towards the counterclockwise outwardly spiraling surface portions 146a causing the width of the channel 142 between the spiral surface portions 142a, 146a to narrow and the outer friction surface of the race 138 to be held with greater force against the inner frictional surface 144. As the clutch housing 134 continues to rotate counterclockwise, the channel 142 will narrow until the slipper 136 and the race 138 become locked to the clutch housing 134. At this point, the input torque from the clutch housing 134 is coupled to the race 138 causing the clutch housing 134 to become locked to the race 138 and the stationary housing 12.

If the direction of rotation of the clutch housing 134 is reversed, the width of the channel 142 will widen, thereby uncoupling the race 138 from the clutch housing 134. Therefore, if the actuator ring 140 does not press against the chamfered edge 146b, the stator 18 and the clutch housing 134 are free to rotate about the clutch housing 134 in the clockwise direction, but will lock to the stationary housing 12 in the counterclockwise direction. On the other hand, when the actuator ring 140 presses against the chamfered edge 146b (in a manner to be described), the actuator ring 140 engages the chamfered edge 146b, causing the slipper segments 146 to move radially outwards away from the race 138. As a result, the stator 18 and the clutch housing 134 become free to rotate in either direction about the stationary housing 12.

The mechanism by which the actuator ring 140 engages the chamfered edge 146b will now be described by returning to FIG. 2a. As shown in the leftmost breakout figure of FIG. 2a, the actuator 140 is coupled to an axially-movable flange 156 through a bearing 158. An inclined flange 160 is secured to the impeller 14 and, together with the axially-movable flange 156, defines a channel 162 for retaining a bearing 164. As will be explained, the flanges 156, 160 rotate with the impeller 14 around a common centre of rotation. Therefore, the inclined flange 160 is inclined outwardly from the centre of rotation and the axially-movable flange 156 extends radially outwards from the centre of rotation.

In operation, when the vehicle is stationary and, therefore, the turbine 16 is not free to rotate, the engine and the impeller 14 will be slowly rotating. As a result, the force exerted by the leaf spring 166 against the axially-movable flange 156 will cause the radially-outermost portion of the channel 162 to narrow and the bearing 164 to be retained in the channel 162 at the radially-innermost portion thereof. Therefore, the actuator ring 140 will press against the chamfered edges 146b of the slipper 136, causing the slipper 136 to be released from the race 138 and allowing the stator 12 to rotate freely about the stationary housing 12. By allowing the stator 12 to rotate freely when the vehicle is stationary, the engine speed and hence the quantity of hazardous emissions can be reduced below that produced by conventional torque converters.

However, as the engine speed increases, the centrifugal force exerted by the bearing 164 against the incline flange 160 and the axially-movable flange 156 will tend to force the axially-movable flange 156 away from the actuator ring 140. When the force exerted against the axially-movable flange 156 exerted by the bearing 164 is greater than the opposing force exerted on the axially-movable flange 156 by the spring 166, the bearing 164 will move into the radially-outermost portion of the channel 162, and the actuator ring 140 will be released from the chamfered edge 146b of the slipper 136, as shown by the rightmost breakout figure of FIG. 2a. At this point, the stator 18 will be fully coupled to the stationary housing 12, allowing the input torque of the impeller 14 to be magnified, as described above.

A variation of the power transfer device 110, for reducing engine drag at high speed operation, is shown in FIG. 2b. As shown in the breakout figure of FIG. 2b, the relative positions of the axially-movable flange 156 and the inclined flange 160 are reversed, such that when the rotational speed of the impeller reaches a maximum threshold value, the bearing 164 presses against the inclined flange 160' and the axially-movable flange 156' and forces the actuator ring 140' towards the chamfered edge 146b, thereby uncoupling the stator 18 from the stationary housing 12. The maximum threshold value is selected such that the stator 18 is released from the stationary housing 12 after the power transfer device 110 has entered converter lock-up mode, thereby allowing the stator 18 to rotate with the impeller 14 and the turbine 16 with minimal parasitic losses.

A second variation of the power transfer device 110 is shown in FIG. 2c embodying both of the variations shown in FIG. 2a and FIG. 2b. With this variation, high speed and low speed parasitic losses reduced.

Turning now to FIG. 4, a power transfer device 210 according to a second embodiment of the invention, and in the form of an automatic gearbox, is shown comprising an input pinion 212, an output cage 214, a reactive annulus 216 in communication with the input pinion 212 and the output cage 214, and a binary clutch for automatically switching the gear ratio of the gearbox between a first gear, ratio in which the reactive annulus 216 is coupled to the gearbox casing 218 and a second gear ratio of unity in which the reactive annulus 216 is coupled to the output cage 214.

The binary clutch comprises an inner clutch pack 220 having a hydraulically-activated inner clutch actuator 222 for coupling and uncoupling the reactive annulus 216 to and from the output cage 214, and a spiral-type one-way clutch 232 coupled to the casing 218 through casing member 224 for progressively respectively coupling and uncoupling the reactive annulus 216 to and from the casing 218 as the inner clutch pack 220 uncouples and couples the reactive annulus from and to the output cage 214. The binary clutch also comprises an outer clutch pack 224 having a hydraulically-activated outer clutch actuator 226 for coupling the reactive annulus 216 to the casing 218 for engine braking. The structure and dynamics of the spiral-type one-way clutch 232 can be better understood by referring now to FIGS. 5a–5c.

The spiral-type one-way clutch 232, shown in FIGS. 5a–5c, comprises a tubular clutch housing 234 coupled to the casing member 222, a resilient C-shaped tubular slipper 236 coaxial to and disposed within the clutch housing 234, and a conical race 238 coaxial to and disposed within the slipper 234. The clutch housing 234 has an inner tubular surface 242 which includes a plurality of counterclockwise outwardly spiraling surface portions 242a.

The slipper 236 includes an inner conical friction surface 244, and an outer tubular surface 246 having a plurality of counterclockwise outwardly spiraling surface portions 246a. The slipper 236 is provided with a slit 236a extending between the inner conical friction surface 244 and the outer tubular surface 246 axially along the length of the slipper 236 for allowing the slipper 236 to expand and contract in response to axial movement of the race 238. The counterclockwise outwardly spiraling surface portions 246a are substantially congruent with the counterclockwise outwardly spiraling surface portions 242a. Preferably, the spiraling surface portions 242a, 246a are involute spirals so that as the clutch housing 234 rotates relative to the slipper 236, the spiraling surface portions 242a remain parallel to the spiraling surface portions 246a. However, other spiral shapes may be adopted as the application demands. The conical race 238 includes an outer conical friction surface 240 congruent with the inner conical friction surface 244.

The inner tubular surface 242 and the outer tubular surface 246 together define a channel 248 disposed between the clutch housing 234 and the slipper 236 extending the length of the clutch housing 234 and the slipper 236. A plurality of roller bearings 250 and resilient elements 252 are disposed within the channel 248 to provide restricted rotational movement between the slipper 236 and the clutch housing 234.

The modes of operation of the spiral-type one-way clutch 232 will now be briefly described. Due to the resilient nature of the slipper 236 and presence of the slit 236a, if the conical race 238 is driven into the slipper 236 such that the outer conical frictional surface 240 engages the inner conical friction surface 244, the slipper 236 will expand radially in response to the axial movement of the race 238 thereby increasing the radial force exerted by the slipper 236 against the race 238. If the race 238 is driven sufficiently deeply into the slipper 236 and then subsequently rotated in the clockwise direction, the counterclockwise outwardly spiraling surface portions 246a will rotate towards the clockwise outwardly spiraling surface portions 242a causing the width of the channel 248 to narrow and the outer conical friction surface 240 to be held with greater force against the inner conical friction surface 36. As the race 238 continues to rotate clockwise, the channel 248 will narrow until the slipper 236 and the race 238 become locked to the clutch housing 234.

If the direction of rotation of the race 238 is reversed, the width of the channel 28 will widen, thereby uncoupling the race 238 from the clutch housing 234. Therefore, if the conical race 238 is axially advanced into the slipper 236, the reactive annulus 216 will be free to rotate in the counterclockwise direction, but will lock to the casing 218 in the clockwise direction. On the other hand, if the conical race 238 is retracted from the slipper 236, the radial force exerted by the slipper 236 against the race 238 will reduce so as to allow the race 238 to rotate freely in both directions. As a result, the reactive annulus 216 will become free to rotate in either direction about the casing 218.

The mechanism by which the conical race 238 is advanced towards and retracted from the slipper 236 will now be described by returning to FIG. 4. As shown in the uppermost breakout figure of FIG. 4, the conical race 238 is coupled to a spring 228 which urges the conical race 238 into the slipper 236. On the other hand, the conical race 238 is also in fluid communication with the hydraulically-activated inner actuator 222 through fluid passageway 230. Therefore, when the inner clutch pack 220 is inactive, the conical race 238 will engage the slipper 236, causing the reactive annulus 216 to be grounded to the casing 218 for a first gear ratio. When the inner clutch pack 220 is activated, the hydraulic fluid pressure exerted against the inner clutch actuator 222 will oppose the pressure exerted on the conical race 238 by the spring 228. As a result, the conical race 238 will smoothly withdraw from the slipper 236, thereby providing a smooth transition from the first gear ratio to the second gear ratio. Similarly, when the inner clutch pack 220 is deactivated, the conical race 238 will smoothly will smoothly engage the slipper 236, thereby providing a smooth transition from the second gear ratio back to the first gear ratio.

Since the one-way clutch 232 freewheels in one direction, the one-way clutch 232 would not be able to maintain the first gear ratio during engine braking or in reverse. In these circumstances, the outer clutch pack 224 can be engaged to couple the reactive annulus 216 to the casing 218. Since the outer clutch pack 224 is therefore only required for engine braking and reverse, the size of the outer clutch pack 224 is less than that used in prior automatic gearbox designs. Further, since the inner clutch pack 222 provides the unity gear ratio, the power loss associated with overrunning drag of the one-way clutch 232 is virtually eliminated.

One variation of the power transfer device 210 is shown in the lowermost breakout figure of FIG. 4. As shown therein, the one-way clutch 232 is replaced with a similar one-way clutch, but activated through an independent fluid passageway 230'. As a result, this variation can be used to select drive line disengagement.

To assist in the understanding of a third embodiment of the invention, a prior art power transfer case will now be described, followed by a description of the third embodiment. Turning to FIG. 6, a prior art four-wheel drive power transfer case, denoted generally as 310, is shown comprising an input shaft 312, a rear wheel torque output shaft 314 coupled to the input shaft 312, a front wheel torque output shaft 316; and a torque transfer gear assembly for transferring torque from the input shaft 312 to the front wheel torque output shaft 316. The torque transfer assembly comprises a first front wheel drive sprocket 318 splined to the input shaft 312, a second front wheel drive sprocket 320 rotatably disposed around the front wheel torque output shaft 316, and a chain 322 trained around the first and second sprockets 318, 320.

The front wheel torque output shaft 316 includes a plurality of splines 324 provided thereon. A splined ring 326 coaxial to the splines 324 is manually axially driven through a fork 328 between a first position in which the splined ring 324 couples the second front wheel drive sprocket 320 to the splines 324 on the front wheel torque output shaft 316, and a second position in which the second front wheel drive sprocket 320 is free to rotate about the front wheel torque output shaft 316. Accordingly, when the splined ring 324 is in the first position, the rear wheel torque output shaft 214 and the front wheel torque output shaft 316 are both coupled to the input shaft 312. When the splined ring 324 is in the second position, only the rear wheel torque output shaft 214 is coupled to the input shaft 312. To reconcile the differential rotation between the front and rear torque output shaft 314, 316 during vehicle manouevres when the splined ring 324 is in the first position, a friction clutch (not shown) is disposed between the second front wheel drive sprocket 320 and a coaxially mounted shaft (not shown) which allows clutch slippage to occur. However, as discussed above, clutch slippage interrupts smooth power transfer during cornering, thereby reducing fuel efficiency and fuel consumption.

The front wheel drive portion of a power transfer device, according to the third embodiment of the invention, and in the form of a power transfer case, will now be described with reference to FIG. 7a. The power transfer device 410 comprises an input shaft (not shown), a rear wheel torque output shaft (not shown), a front wheel torque output shaft 416, a first front wheel drive sprocket (not shown) splined to the input shaft, and a torque transfer assembly 420 coupled to the front wheel torque output shaft 416, and a chain 422 trained around the first front wheel drive sprocket and the torque transfer assembly 420. As will becomes apparent, the torque transfer assembly 430 transfers torque from the first front wheel drive sprocket to the front wheel torque output shaft 416 while allowing overrunning of the front wheel torque output shaft 416 independently of the direction of rotation of the input shaft.

The torque transfer assembly 420 comprises an annular sprocket 424 rotatably disposed around the front wheel torque output shaft 416, a pair of one-way clutches 432a, 432b, and an actuator 426. The annular sprocket 424 includes an inner tubular surface surrounding the front wheel torque output shaft 416 defining an internal cavity 428 therebetween, with the one-way clutches 432a, 432b being disposed inside the internal cavity 428.

The one-way clutches 432 are similar to the one-way clutch 232. The one-way clutch 432a comprises a tubular clutch housing 434a coupled to the annular sprocket 424, a resilient C-shaped tubular slipper 436a coaxial to and disposed within the clutch housing 434a, and a conical race 438a disposed within the slipper 434a. The clutch housing 434a has an inner tubular surface which includes a plurality of clockwise outwardly spiraling surface portions. The slipper 436a includes an inner conical friction surface 444a, and an outer tubular surface having a plurality of clockwise outwardly spiraling surface portions which are congruent with the clockwise spiraling surface portions on the clutch housing. The slipper 436a is provided with a slit extending between the inner conical friction surface 444a and the outer tubular surface axially the length of the slipper 436a. A channel is disposed between the clutch housing 434a and the slipper 436a for retaining a plurality of roller bearings and resilient elements therein.

The one-way clutch 432b is a mirror image of the one-way clutch 432a, and comprises a tubular clutch housing 434b, a resilient C-shaped tubular slipper 436b, and a conical race 438b. The clutch housing 434b has an inner tubular surface which includes a plurality of counterclockwise outwardly spiraling surface portions. The slipper 436b includes an inner conical friction surface 444b, and an outer tubular surface having a plurality of counterclockwise outwardly spiraling surface portions which are congruent with the counterclockwise spiraling surface portions on the clutch housing. A channel is disposed between the clutch housing 434b and the slipper 436b for retaining a plurality of roller bearings and resilient elements therein.

Figure 7C:
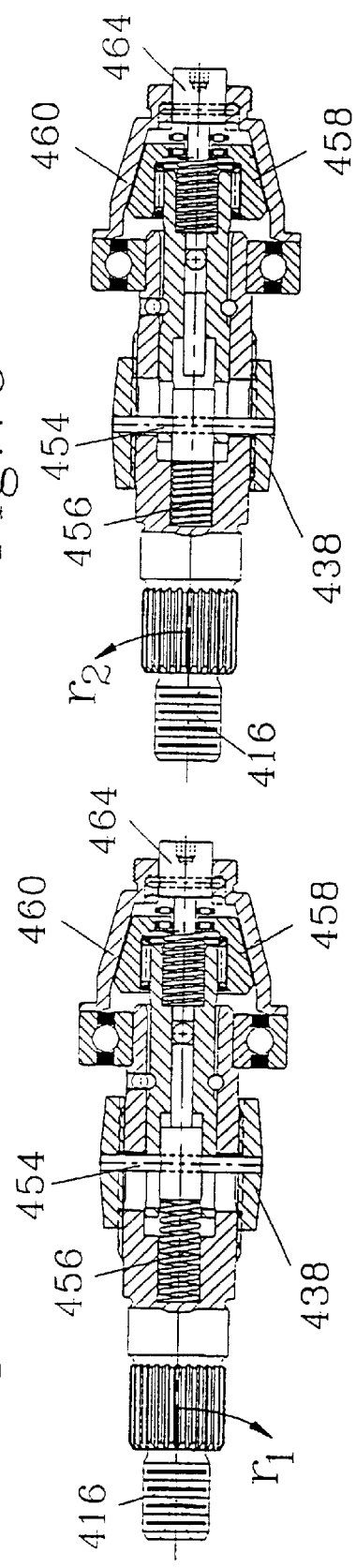

The conical race 438a and the conical race 438b are disposed upon a tubular common race member 438 but with opposite tapers. The race member 438 is splined to the front wheel torque output shaft 416 and moves axially thereon between a first position (FIG. 7b) in which the race 438a engages the slipper 436a and a second position (FIG. 7c) in which the race 438b engages the slipper 436b. Accordingly, when the race member 438 is moved to the first position, and the input shaft is rotating in the clockwise direction, the annular sprocket 424 will drive the front wheel torque output shaft 416 in the clockwise direction, with the front wheel torque output shaft 416 being free to overrun the annular sprocket 424 in the clockwise direction. When the race member 438 is moved to the second position, and the input shaft is rotating in the counterclockwise direction, the annular sprocket 424 will drive the front wheel torque output shaft 416 in the counterclockwise direction, with the front wheel torque output shaft 416 being free to overrun the annular sprocket 424 in the counterclockwise direction.

Figure 8:
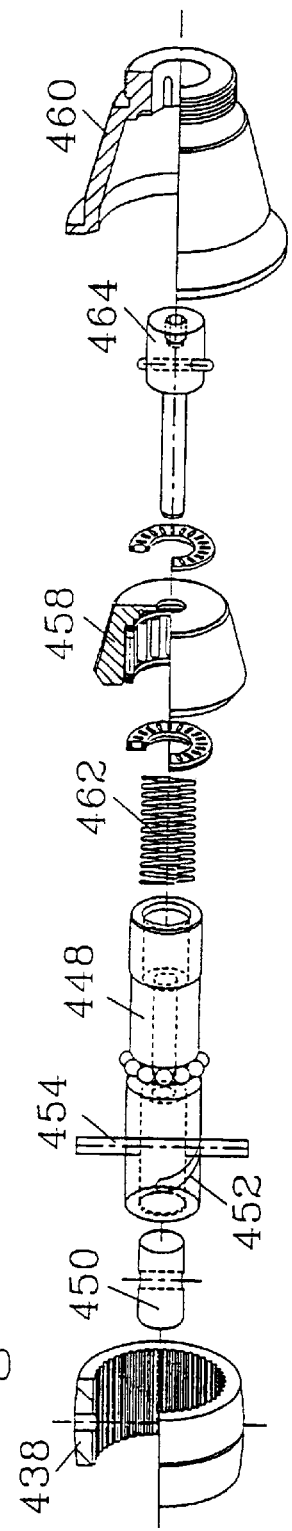
FIG. 8 is an exploded view of the clutch actuator used in the power transfer device shown in FIG. 7.

The actuator 426 will now be described with reference to FIGS. 7a and 8. As shown therein, the front wheel torque output shaft 416 includes a tubular cavity 446. The actuator 426 comprises a tubular member 448 coaxial to and disposed within the common race member 438 and the tubular cavity 446, and a tubular plug 450 disposed within the tubular member 448. The tubular member 448 includes a spiral actuator cam 452, an actuator shaft 454 coupled to the common race member 438 and passing through the tubular plug 450 and the actuator cam 452, and a first coil spring 456 disposed within the tubular cavity 446 and axially pressing against the tubular plug 450. The actuator 426 also includes a one-way clutch 458 coupled between the tubular member 448 and the casing 460 of the power transfer case 410.

In operation, when the input shaft is rotating in the clockwise (forward) direction, the rear wheel torque output shaft and the annular sprocket 424 will be forced to rotate in the clockwise direction. The first coil spring 456 will slide the race member 438 to the first position, shown in FIG. 7b, causing the annular sprocket 424 to engage the slipper 434a and drive the front wheel torque output shaft 416 in the forward direction. As a result, the vehicle will move in the forward direction. If the vehicle enters a turn, causing the front wheels to rotate faster than the rear wheels, the front wheel torque output shaft 416 will overrun the annular sprocket 424, allowing the turn to be smoothly completed. If at any time the rear wheels begin to slip, the vehicle will maintain its speed due to the power delivered to the front wheels through the one-way clutch 432a.

When the direction of the input shaft is reversed, the rear wheel torque output shaft and the annular sprocket 424 will be forced to rotate in the counterclockwise (reverse) direction, thereby urging the automobile to move backwards. Therefore, the front wheel torque output shaft 416 will be forced to rotate in the counterclockwise direction. However, counterclockwise rotation of the tubular member 448 will be resisted by the one-way clutch 458, causing the race member 438 to slide to the second position, shown in FIG. 7c, under action of the actuator cam 452 and the actuator shaft 454. The annular sprocket 424 will then engage the slipper 434b and drive the front wheel torque output shaft 416 in the reverse direction.

As shown in FIG. 7a, the clutch body of the one-way clutch 458 is held against the casing 460 through a second coil spring 462 and a bayonet plug 464. If the bayonet plug 464 is released from the casing 460, the first and second coil springs 456, 462 will urge the race member 438 to a position in between the one-way clutches 436a, 436b (FIG. 7a). As a result, the annular sprocket 424 will be uncoupled from the front wheel torque output shaft 416 in both directions, allowing the vehicle to be towed.

Figure 9A:
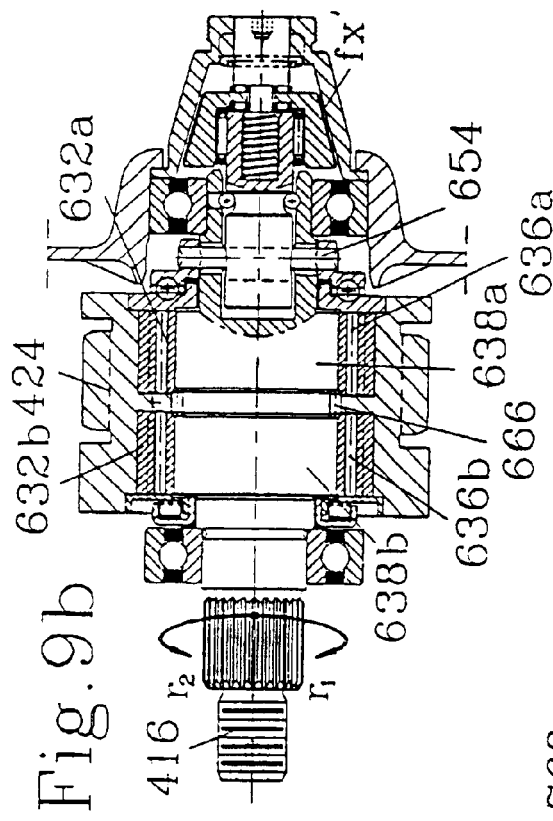
FIGS. 9a–9c are magnified axial cross-sectional view of variations of the power transfer device shown in FIG. 7.

Other variations of the torque transfer assembly 420 are possible. One such variation, is shown in FIG. 9a, and comprises replacing the one-way clutches 432a, 432b, and conical race member 438 with cylindrical one-way clutches 532a, 532b and a cylindrical common race member 538. A full complement of ball bearings 566a, 566b is disposed on the race member 538 and impinge upon the chamfered edges of the one-way clutch slippers 536a, 536b as the actuator shaft 454 axially shifts the race member 538 between the first position and the second position.

Figure 9B:
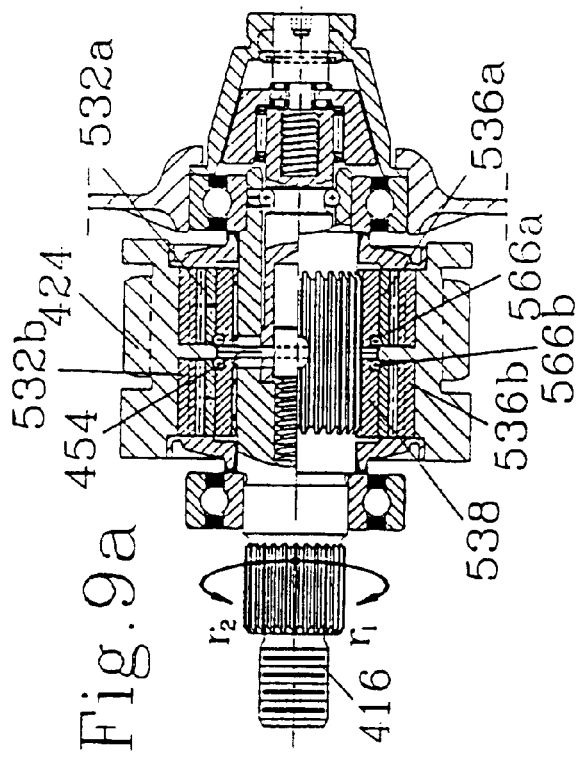
Figure 9C:
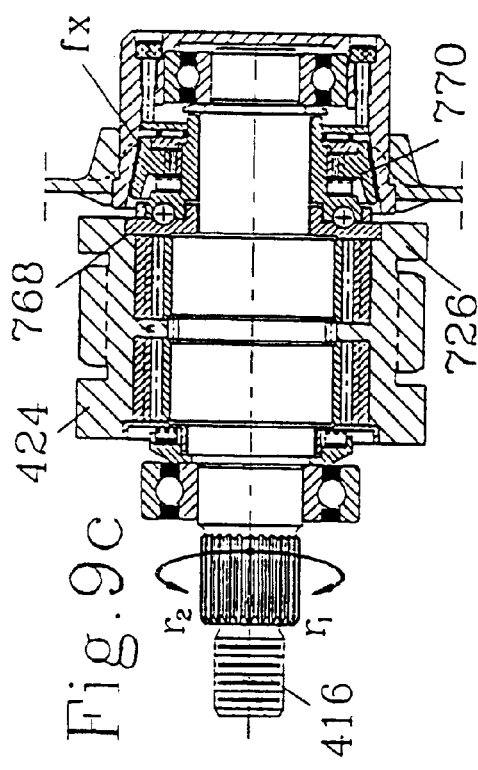

Another variation, is shown in FIG. 9b, and comprises replacing the one-way clutches 432a, 432b, and conical race member 438 with cylindrical axially movable one-way clutches 632a, 632b and separate cylindrical race members 638a, 638b. A full complement of tapered roller bearings 666 is disposed in a race in between the race members 638a, 638b and impinge upon the chamfered edges of the one-way clutch slippers 636a, 636b as the actuator shaft 654 axially shifts the slippers 636a, 636b between the first position and the second position.

The foregoing description of the preferred embodiment is intended to be illustrative of the present invention. Those of ordinary skill be able to make certain additions, deletions or modifications to the described embodiment without departing from the spirit or scope of the invention as defined by the appended claims.

I claim:

1. An automatic gearbox for transferring power between an engine and a rotational output, the automatic gearbox comprising:
    a torque input member;
    a torque output member;
    a reactive member in communication with the torque input member and the torque output member;
    a binary clutch for automatically switching the reactive member between a first mode coupling to a rotational reference and a second mode coupling to one of the torque input member and the torque output member, the binary clutch comprising a first clutch for coupling the reactive member to said one torque member, and a one-way clutch for progressively coupling and uncoupling the reactive member to and from the rotational reference when switching between the first and second mode, and
    wherein the first clutch includes a first clutch actuator, and the one-way clutch comprises a spiral-type one-way clutch, the spiral-type one-way clutch including a tubular clutch body, a tubular slipper disposed coaxial to the clutch body, a spiral channel disposed between the clutch body and the slipper and including a plurality of roller elements disposed therein, and a slipper actuator in communication with the slipper and the first clutch actuator for progressively radially moving the slipper relative to the clutch body in response to a position of the first clutch actuator.

2. The automatic gearbox according to claim 1, wherein the first clutch actuator is hydraulically actuated, and the slipper actuator is in fluid communication with the first clutch actuator.

3. The automatic gearbox according to claim 1, wherein the binary clutch includes a second clutch for coupling the reactive member to the rotational reference during engine breaking.

* * * * *